United States Patent
Aftab et al.

(10) Patent No.: US 11,544,617 B2
(45) Date of Patent: Jan. 3, 2023

(54) NETWORK-BASED MACHINE LEARNING MICROSERVICE PLATFORM

(71) Applicant: AT&T Intellectual Property I, L.P., Atlanta, GA (US)

(72) Inventors: Syed Anwar Aftab, Budd Lake, NJ (US); Guy Jacobson, Bridgewater, NJ (US); Reuben Klein, East Brunswick, NJ (US); John Murray, Denville, NJ (US); Mazin Gilbert, Warren, NJ (US); Manoop Talasila, Somerset, NJ (US); Kazi Farooqui, Morganville, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1291 days.

(21) Appl. No.: 15/960,265

(22) Filed: Apr. 23, 2018

(65) Prior Publication Data

US 2019/0325353 A1 Oct. 24, 2019

(51) Int. Cl.
*G06N 20/00* (2019.01)
*G06N 5/02* (2006.01)
*H04L 67/10* (2022.01)

(52) U.S. Cl.
CPC .............. *G06N 20/00* (2019.01); *G06N 5/02* (2013.01); *H04L 67/10* (2013.01)

(58) Field of Classification Search
CPC ........... G06N 20/00; G06N 5/02; H04L 67/10
See application file for complete search history.

(56) References Cited

U.S. PATENT DOCUMENTS

| | | | |
|---|---|---|---|
| 10,417,350 B1* | 9/2019 | Mohamed | G06N 20/00 |
| 11,182,691 B1* | 11/2021 | Zhang | G06N 20/00 |
| 2016/0148115 A1* | 5/2016 | Sirosh | G06N 20/00 706/11 |
| 2016/0342906 A1 | 11/2016 | Shaashua et al. | |
| 2017/0098162 A1 | 4/2017 | Ellenbogen et al. | |
| 2017/0132528 A1 | 5/2017 | Aslan et al. | |
| 2017/0343368 A1 | 11/2017 | Rangan et al. | |
| 2018/0034921 A1 | 2/2018 | Gopalan et al. | |
| 2018/0101533 A1 | 4/2018 | Robichaud | |
| 2018/0130019 A1* | 5/2018 | Kolb | G06F 16/24578 |
| 2019/0065985 A1* | 2/2019 | Fieres | G06F 16/217 |
| 2019/0155633 A1* | 5/2019 | Faulhaber, Jr. | G06F 9/45558 |
| 2021/0133620 A1* | 5/2021 | Frank | G06N 3/0454 |

FOREIGN PATENT DOCUMENTS

| | | |
|---|---|---|
| WO | WO 2018/005433 | 1/2018 |
| WO | WO 2018/017546 | 1/2018 |

OTHER PUBLICATIONS

Mizutani, Haruo, et al. "Whole brain connectomic architecture to develop general artificial intelligence." Procedia Computer Science 123 (2018): 308-313.

Sung, Nako, et al. "NSML: A Machine Learning Platform That Enables You to Focus on Your Models." arXiv preprint arXiv:1712.05902 (2017).

* cited by examiner

*Primary Examiner* — Jeong S Park (57) ABSTRACT

A method may include a processing system having at least one processor for receiving a first machine learning model, the first machine learning model in a first format associated with a first development environment, adapting the first machine learning model to a containerized environment, validating the first machine learning model according to at least one validation criterion associated with a repository, and publishing the first machine learning model to the repository.

20 Claims, 4 Drawing Sheets

NETWORK-BASED MACHINE LEARNING MICROSERVICE PLATFORM

The present disclosure relates generally to machine learning models, and more particularly to methods, computer-readable media, and devices for publishing a machine learning model to a repository.

BACKGROUND

Big data applications and services may employ machine learning models that analyze large volumes of data to deliver various insights, key performance indicators, and other actionable information to the users of the applications and services. Designers may differentiate machine learning models (MLMs), or machine learning algorithms (MLAs) for different big data applications involving video, speech, text, location information, images, network traffic data, and so forth. For example, different machine learning models (derived from corresponding MLAs) may include support vector machine (SVMs), e.g., binary classifiers and/or linear binary classifiers, multi-class classifiers, kernel-based SVMs, or the like, a distance-based classifier, a decision tree algorithm/model, a k-nearest neighbor (KNN) algorithm/model, and so on.

SUMMARY

In one example, the present disclosure describes a device, computer readable medium and method for receiving a first machine learning model, the first machine learning model in a first format associated with a first development environment, adapting the first machine learning model to a containerized environment, validating the first machine learning model according to at least one validation criterion associated with a repository, and publishing the first machine learning model to the repository.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, non-transitory (i.e., tangible or physical) computer-readable storage media, and methods for publishing a machine learning model to a repository. For instance, in one example, a processing system including at least one processor may receive a first machine learning model, the first machine learning model in a first format associated with a first development environment, adapt the first machine learning model to a containerized environment, validate the first machine learning model according to at least one validation criteria associated with a repository, and publish the first machine learning model to the repository.

Big data applications and services may employ machine learning models that analyze large volumes of data to deliver various insights, key performance indicators, and other actionable information to the users of the applications and services. Designers may differentiate machine learning models (MLMs), or machine learning algorithms (MLAs) for different big data applications involving video, speech, text, location information, images, network traffic data, and so forth. As referred to herein, a machine learning model may comprise an untrained MLA, or an MLA that has been fully or partially "trained" or configured in accordance with input data (e.g., training data) to perform a particular service. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth.

Machine learning systems are increasingly being used to perform various data processing tasks, such as telecommunication network data routing, policy enforcement, and so forth, facial recognition, character recognition, object recognition, route planning, package sorting, precision control, autonomous navigation, dynamic pricing, automated securities and commodities trading, and so on. Many of the components (e.g., MLAs and/or MLMs) are reusable across a variety of data processing tasks for the same or similar applications, or for entirely different applications. Examples of the present disclosure provide a network-based platform where developers may upload and offer their MLAs and/or MLMs for sharing, purchase, lease, or license, and where users may browse and select MLAs and/or MLMs for their data processing tasks, and where users may assemble MLMs and other microservices into composite solutions.

MLMs are fundamentally different from other software components. For example, MLMs are frequently updated, such as training MLMs with new training data sets to produce better predictions or classifications. In addition to continuous learning through new training data sets, MLMs often require comprehensive analysis of multi-dimensional data. Therefore, examples of the present disclosure are designed to efficiently address these ML specific complexities. In particular, examples of the present disclosure provide a platform for automation of data-powered decision making related to machine learning (ML)/artificial intelligence (AI) software models and applications. The platform includes an extensible framework and a marketplace for machine learning solutions with continuous learning capabilities. The extensible framework provides the capability to edit, integrate, compose, package, train and deploy ML/AI microservices for software defined network (SDN) applications, "big data" services, and other use cases. As referred to herein, a "microservice" is an executable package, i.e., a set of configuration files or "artifacts" that can be executed by a processing system to perform a data processing task, such as a script, along with requisite libraries and any other data to enable the executable to properly run on the processing system. In one example, a MLM-based microservice is an executable that is generated from a MLA or MLM taken from a developer's environment and adapted, or enhanced for deployment in a target environment, in particular, a containerized environment.

In one example, the platform is a cloud-based scalable system built on open source components. The platform comprises an adaptable common framework that allows self-serve customization of composite solutions by various users. For instance, in one example, the platform provides an abstraction layer for interworking with pre-defined ML tools (such as H2O, RCloud, TensorFlow, Keras, Scikit-learn, etc.) with built-in flexibility to plug-and-play with other tools in the future. The platform also generates MLM-based microservices that can be rapidly on-boarded and deployed with no additional software development by a MLM developer. In one example, the platform also provides marketplace of reusable, crowd-sourced microservices based upon intelligent machine learning models which can be trained and retrained in the field.

In one example, the platform includes a design studio that integrates discrete technologies with differing capabilities (H2O, Scikit-learn, etc.) into a single solution. For instance, the design studio allows developers or other users to combine MLM-based microservices into composite solutions (which may also be adapted into microservices) for more complex data processing tasks. In one example, the platform also includes a marketplace of microservices, e.g., MLM-based microservices and microservices comprising composite solutions, along with other non-MLM-based microservices, such as data collectors, data transformers, data cleaners, data labelers, data validators, and so forth. In one example, the marketplace provides automatic updates, usage monitoring, and access controls through connected platform nodes. This platform includes functions for importing, packaging, integrating, training, and cataloging so that ML/AI microservices can be securely shared and deployed.

MLMs are already being built with many different tools that may be adapted to different types of problems, or that may attract different communities of developers. In addition, new tools and languages may be developed which expand the capabilities of MLAs and/or MLMs, making existing toolkits obsolete. This may lead to a set of ML/AI solutions which may be mutually incompatible and lead to a loss of existing knowledge or repetition of the same services for different languages, development environments, target platforms, etc. Examples of the present disclosure address these issues by encapsulating MLMs in the form of self-contained microservices, so that multiple microservices built with different tools can be made interoperable. In addition, developers may offer MLMs/AI algorithms to a large population of other developers and enterprises who can acquire models from the marketplace, chain them together in composite solutions to perform complex tasks and apply the composite solutions to specific problems.

The platform supports a set of basic building blocks for machine learning and predictive analysis in multiple domains such as network automation, customer care, health care predictions, etc. The platform is targeted to various audiences with different sets of technical skills varying from business user to data scientist. For example, the platform covers multiple aspects of building and using ML solutions, such as onboarding of MLMs and other artifacts (models), microservices generation, composite solution assembly, certification/validation, and orchestration/deployment of services onto a distributed/cloud-computing environment. The containerized nature of the microservices allows composite solutions to be dynamically composed out of basic building blocks to accommodate individual use cases and requirements of target environments where solutions may be deployed. More specifically, the platform provides a rich catalog of various microservices such as data collectors, data labelers, data transformers and MLMs. The platform users can select and assemble these in various combinations to satisfy specific end-to-end solutions such as network automation, customer care, health care predictions, and so forth. The platform of the present disclosure therefore integrates all of these ML-related components into a unified system that is made available to a wide range of users, some of whom may not be experts in ML technologies, and allowing such users to take advantage of algorithms/models created by ML subject matter experts (SMEs).

There are many tools emerging and maturing to build individual MLMs, each designed around a specific approach to modeling. Each tool has its own set of languages, has its own library of templates, and is often built around an execution infrastructure or cloud service which provides specific support to the product of that particular tool. However, in order to build a complex AI program, a series of models and other functionalities may be chained together to perform a complete function. As one example, a video program may contain video segments which can be detected by fades and cuts, and each frame of each segment may contain faces, locations, and numerous other objects. There may be graphics in some frames; there may be dialogue, music, and/or other audios; some segments may show action, while others are static, and so on. Different models may be used to make a single decision about which video to show, where to place ads, etc. A single AI model may not exist to take all of this input data into account and make a decision, and if it did, the model would be so specialized as to have only a single, highly specialized purpose. Notably, television subscribers are increasingly interested in selecting the right piece of content from an ever-growing media library; but the criteria used to determine which content is "best" is ever changing. Thus, algorithms of this nature are increasingly being relied upon to provide individualization and personalization to various subscribers. The foregoing is just one example of how composite solution generated via the platform of the present disclosure may be used in the delivery of television services. In addition, network operations and digital security are other areas where advanced and intelligent automation is becoming increasingly important. These and other aspects of the present disclosure are discussed in greater detail below in connection with the examples of FIGS. 1-4.

Figure 1:
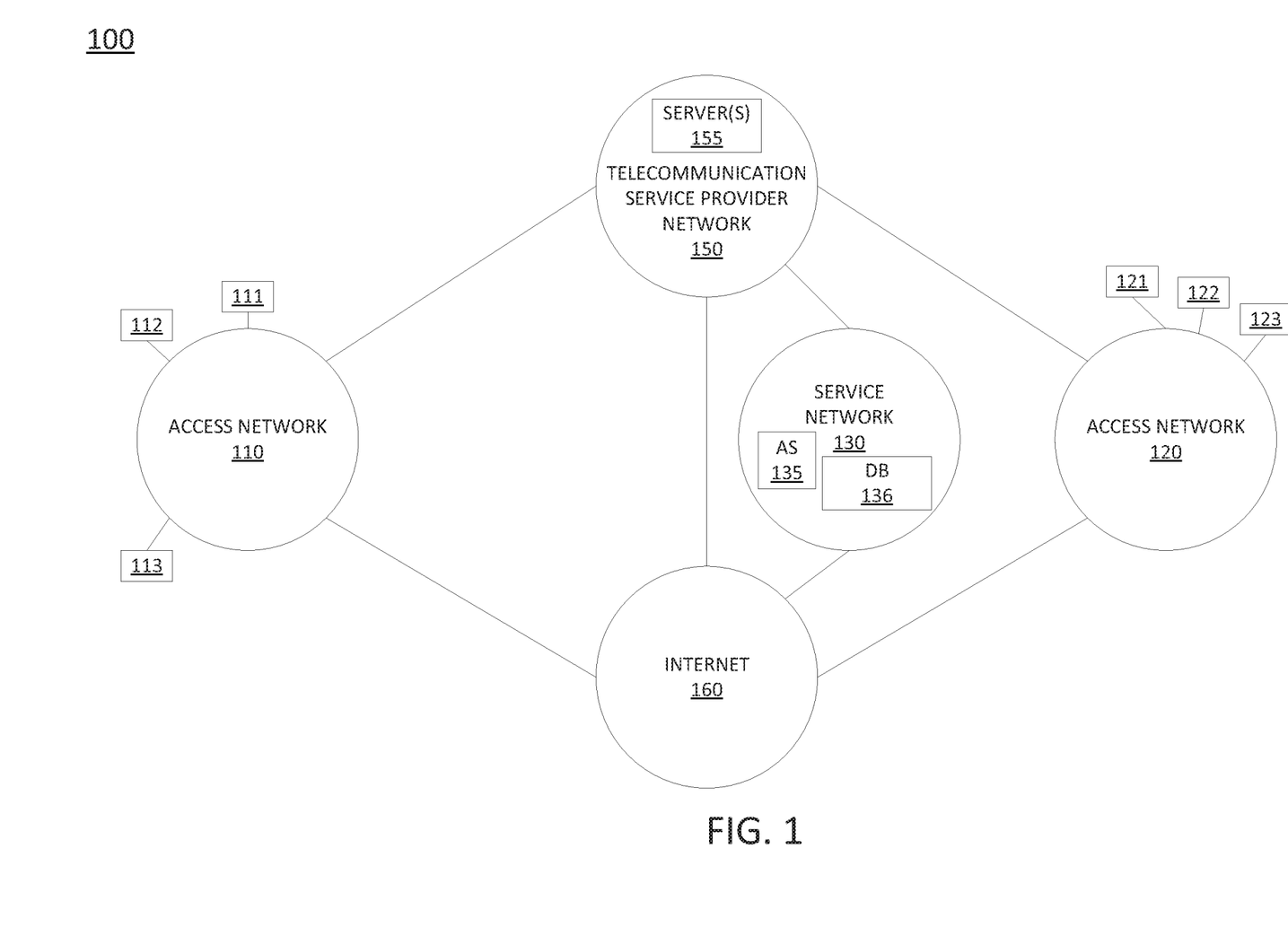
FIG. 1 illustrates one example of a system including a telecommunication service provider network, according to the present disclosure.

To aid in understanding the present disclosure, FIG. 1 illustrates an example system 100 comprising a plurality of different networks in which examples of the present disclosure for publishing a machine learning model to a repository may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing system, such as computing system 400 depicted in FIG. 4, and may be configured to host one or more centralized system components in accordance with the present disclosure. For example, a first centralized system component may comprise a database of assigned telephone numbers, a second centralized system component may comprise a database of basic customer account information for all or a portion of the customers/subscribers of the telecommunication service provider network 150, a third centralized system component may comprise a cellular network service home location register (HLR), e.g., with current serving base station information of various subscribers, and so forth. Other centralized system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. Other centralized system components may include, for example, a layer 3 router, a short message service (SMS) server, a voicemail server, a video-on-demand server, a server for network traffic analysis, and so forth. It should be noted that in one example, a centralized system component may be hosted on a single server, while in another example, a centralized system component may be hosted on multiple servers, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113 and 121-123, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide mobile core network 130 functions, e.g., of a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and or users. For example, telecommunication service provider network 150 may provide a cloud storage service, web server hosting, and other services. As such, service network 130 may represent aspects of telecommunication service provider network 150 where infrastructure for supporting such services may be deployed. In another example, service network 130 may represent a third-party network, e.g., a network of an entity that provides a service for providing a solution comprising a set of machine learning models for performing a data processing task, in accordance with the present disclosure.

In the example of FIG. 1, service network 130 may include an application server (AS) 135. In one example, AS 135 may comprise all or a portion of a computing device or system, such as computing system 400, and/or processing system 402 as described in connection with FIG. 4 below, specifically configured to perform various steps, functions, and/or operations for publishing a machine learning model to a repository. For instance, AS 135 may comprise a network-based platform for onboarding MLMs and generating microservices therefrom, for assembling microservices into composite solutions, for validating MLMs, MLM-based artifacts and/or microservices, and composite solutions, for publishing MLM-based microservices and/or composite solutions to a repository, and so forth. In one example, service network 130 may also include a database (DB) 136, e.g., a physical storage device integrated with AS 135 (e.g., a database server), or attached or coupled to the AS 135, to store various types of information in support of systems for publishing a machine learning model to a repository, in accordance with the present disclosure. In other words, DB 136 may comprise such a repository of the network-based platform. For instance, DB 136 may store various MLMs (more specifically, in one example, microservices generated from such MLMs) for deployment in a containerized environment, training and/or testing data for the various MLMs, various libraries that may be called by MLMs, artifacts, and/or microservices, lists of function categories and associated MLMs, MLM performance parameters, templates and/or previous composite solutions for various data processing tasks, and so forth. In one example, AS 135 and/or DB 136 may comprise cloud-based and/or distributed data storage and/or processing systems comprising one or more servers at a same location or at different locations. However, for ease of illustration, these components are depicted as standalone devices in FIG. 1.

Figure 4:
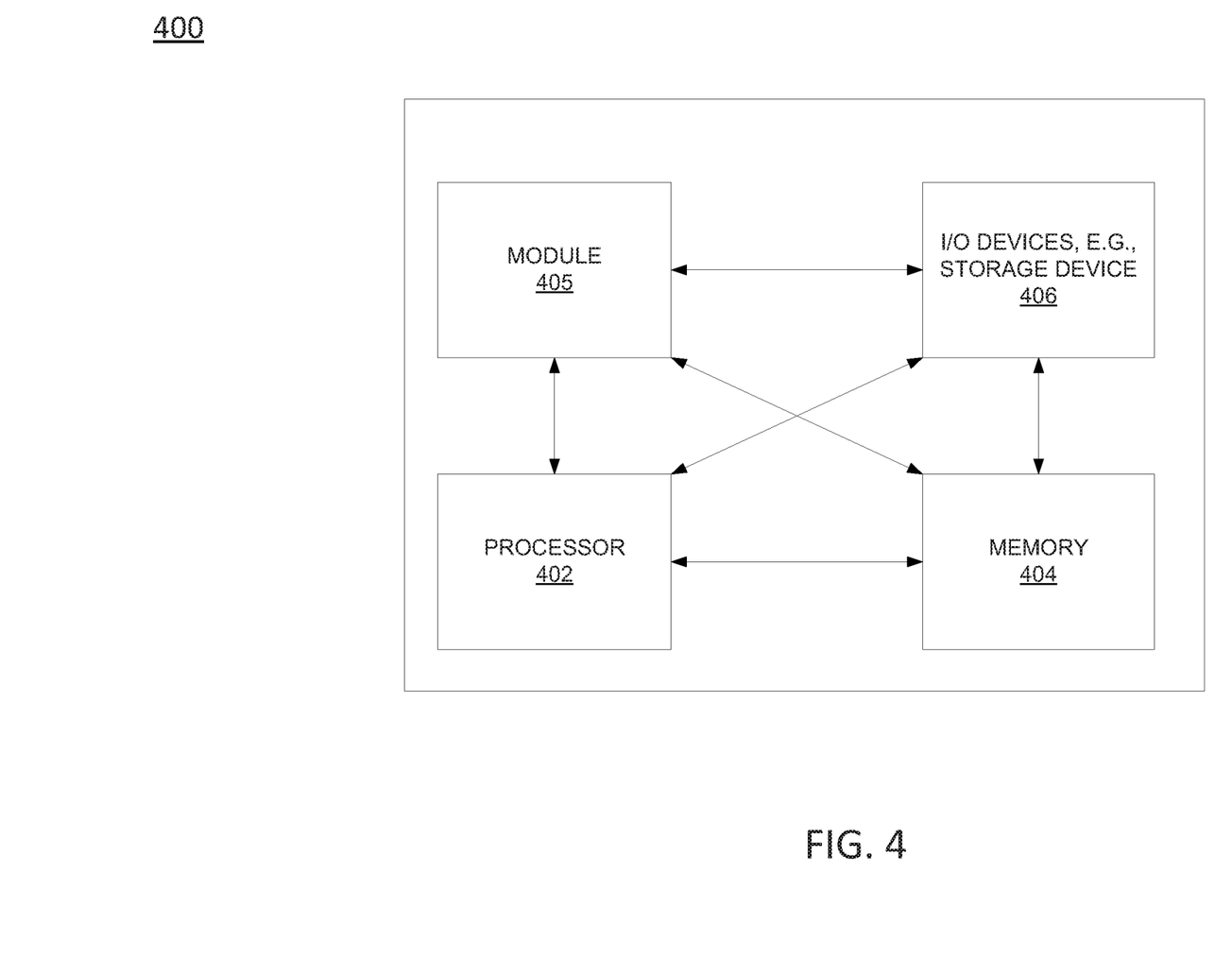
FIG. 4 illustrates a high-level block diagram of a computing device specially programmed to perform the functions described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, any one or more of user devices 111-113 and/or user devices 121-123 may comprise developer devices for uploading and offering MLM (and or underlying MLA) for sharing, purchase, lease, download, licensing, etc. via AS 135. In addition, any one or more of user devices 111-113 and/or user devices 121-123 may comprise user devices for uploading and/or obtaining MLMs, microservices, composite solutions, and/or related data, such as training data sets, libraries, and so forth, to and from AS 135. In one example, microservices, composite solutions, and/or related data may be selected by user devices 111-113, or by endpoint devices of network technicians, administrators, and others, for deployment in one or more network-based servers, e.g., servers 155 of telecommunication service provider network 150. Thus, AS 135 may send instructions to one or more of servers 155 to obtain and to run such a microservice or composite solution. In one example, one or more of the servers 155 may comprise a SDN-controller that may be instructed by AS 135 to deploy a microservice and/or a composite solution to one or more of servers 155 (e.g., a host system for hosting one or more virtual machines). In this regard, AS 135 may maintain communications with one or more of user devices 111-113, user devices 121-123, and/or servers 155 via access networks 110 and 120, telecommunication service provider network 140, Internet 160, and so forth. Various additional functions of AS 135 in connection with publishing a machine learning model to a repository are described in greater detail below in connection with the examples of FIGS. 2 and 3.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, a user may select a composite solution and direct the composite solution to be executed via a cluster controlled by the user or by service network 130. Thus, the system 100 may include a cluster comprising multiple computing devices in access networks 110 and/or 120, in service network 130, in another service network connected to Internet 160 (e.g., a cloud computing provider), and so forth. Thus, these and other modifications are all contemplated within the scope of the present disclosure.

Figure 2:
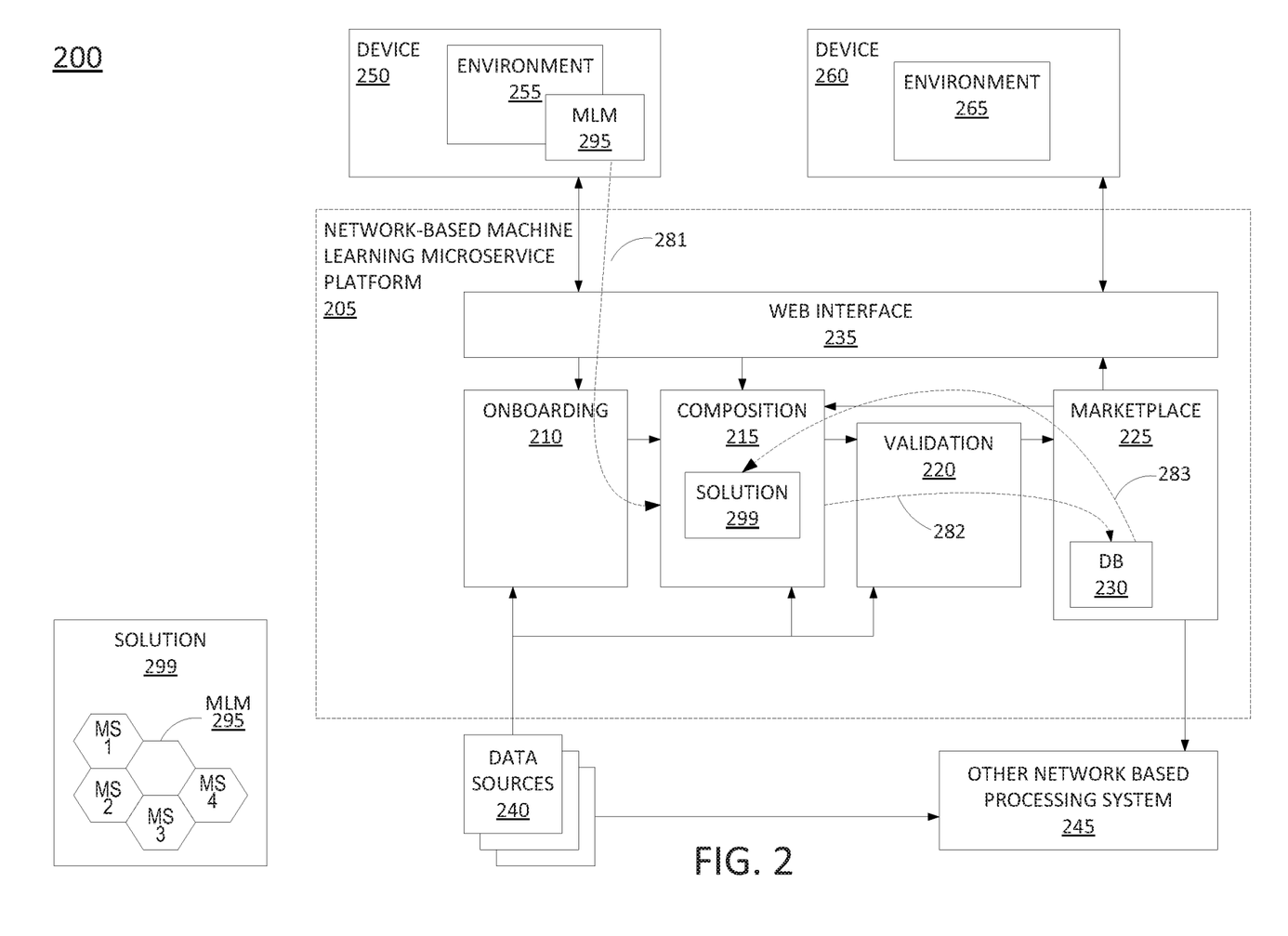
FIG. 2 illustrates an example system including a network-based machine learning microservice platform, according to the present disclosure.

FIG. 2 illustrates an example system 200 including a platform 205 (e.g., a network-based machine learning microservice platform). In particular, FIG. 2 illustrates an example where a MLM 295 is on-boarded into the platform 205 and incorporated into a composite solution 299. In one example, the platform 205 may comprise a processing system, e.g., a server or multiple servers collectively configured to perform various steps, functions, and/or operations in accordance with the present disclosure. In one example, the platform 205 includes a web interface 235 for user devices, such as devices 250 and 260, to access various components of the platform. Devices 250 and 260 may each comprise a desktop computer, a cellular smart phone, a laptop, a tablet computer, a cloud based processing system providing a user environment, and so forth. It should be noted that devices 250 and 260 may provide different development environments 255 and 265, e.g., RCloud, TensorFlow, or the like, as illustrated in the figure.

In accordance with the present disclosure the platform 205 comprises several functions, including an onboarding function 210, a composition function 215, a validation function 220, and a marketplace function 225. The onboarding function 210 interacts with user devices, such as device 250 to begin the process of uploading and publishing a MLM to a repository (e.g., DB 230 associated with the marketplace function 225). In the example of FIG. 2, it can be seen that the device 250 has a MLM 295 that has been developed in the environment 255. In one example, the device 250 may upload the MLM 295 to the platform 205 via the web interface 235. In one example, the MLM 295 is then processed by the onboarding function 210. It should be noted that MLM 295 may be fully or partially trained, or may be untrained at the time the MLM 295 is on-boarded. When the MLM 295 is untrained or only partially trained prior to onboarding, the MLM 295 may be further configured via the composition function 215, as described in greater detail below.

In accordance with the present disclosure, onboarding is a process whereby developers bring models they have created into an instance of the platform 205. Developers can use a wide variety of popular languages and machine-learning toolkits to create MLMs. For example, a developer may choose from Python, R, Java, and the like, with access to various toolkits associated with each language (such as Scikit-learn, Keras, TensorFlow, H2O, etc.). In one example, to onboard a MLM, a developer may first install a language-specific client library (provided from the platform 205) on a local system (e.g., device 250). In one example, the developer may also obtain credentials to use a specific platform instance (e.g., access credentials to platform 205). Using the existing model code and the client library, the developer can either push the MLM 295 directly into platform 205, or dump a serialized representation of the MLM 295, which can be on-boarded by onboarding function 210 via the web interface 235. The client library provides tools that inspect the MLM 295 and its code, creating several artifacts for onboarding: input signatures, output signatures, the MLM code itself, and related information about the local environment 255. In one example, the type signatures of the inputs and outputs of the model are determined via introspection and documented. For instance, in one example, Protobuf is used to describe the input and output signatures, and a model.proto file is created. In addition, information about the local environment 255 is compiled into metadata, also using introspection. This includes the language being used, and the list libraries and packages that are dependent of the MLM 295, along with the versions of each being used.

In one example, the metadata is bundled into a file (e.g., a Java Script Object Notation (JSON) file, an Extensible Markup Language (XML) file, a Yet Another Markup Language (YAML) file, or the like) that describes the runtime environment needed by the MLM 295 in sufficient detail to recreate the runtime environment within a microservice. The code and data that characterize the MLM 295 are serialized (in a way that depends on the specific language) into an opaque artifact. The several artifacts together fully describe the MLM 295, and they can be either pushed directly into the platform 205 via the web interface 235, or dumped into a package for web onboarding via the onboarding function 210. In particular, various aspects of the above described functions may alternatively be performed on device 250 or on the platform 205 via the onboarding function 210. In one example, the onboarding function 210 may use GitHub pulls and the REST protocol to onboard the MLM 295, e.g., when compatible with the development environment 255.

In any event, once these artifacts are transferred to or generated by the onboarding function 210, the process of creating a catalog entry and generating a runnable microservice implementing the MLM 295 is begun. In one example, the metadata is parsed, and an entry in the catalog of DB 230 is created for the MLM 295. Next, a microservice is created. In particular, a microservice is a container for operating in a containerized environment that includes all of the codes, libraries, and any other data necessary for the MLM to run. In one example, the containerized environment comprises Docker. Accordingly, in one example the Docker toolkit is used to construct the microservice image. However, it should be noted that examples of the present disclosure are equally applicable to other containerized environments and containerization technologies, such as App Container Image (ACI), Rocket, Drawbridge, an Open Container Initiative (OCI)-based containerization environment, etc.

In one example, each language/toolkit supported has its own "model runner" code that wraps a MLM (e.g., the several artifacts characterizing the MLM as uploaded), and provides a web service, creating application programming interfaces (API(s)) based on the method(s) implemented in the MLM. In one example, the MLM runners provide RESTful interfaces which use Protobuf to deserialize the MLM inputs and serialize MLM outputs. In one example, microservice generation takes the information provided in the metadata and creates a runnable image (e.g., using Docker), by installing the software (including languages, toolkits, packages) to replicate the runtime environment used by the data scientist within the microservice. The model runner and the on-boarded (serialized) code/data are also installed, along with codes compiled from the uploaded artifacts for (de)serialization of inputs/outputs of the model's web service.

Once MLM 295 is incorporated into the platform 205 by onboarding, the MLM 295 may be made available in a catalog, or repository and can be made publicly available and shared in a variety of ways, including transfer to other platforms of the same or a similar nature as platform 205. For instance, a developer may cause MLM 295 to be stored in DB 230 and made available in a catalog via the composition function 215. For instance, the composition function 215 may provide a "publish" tool, which, when selected by a developer or other users, may cause the MLM 295 (e.g., a microservice generated from the MLM 295 as on-boarded) to be published to DB 230. In one example, the MLM-based microservice is first passed to validation function 220 before storage in DB 230.

In one example, validation function 220 may be configured with one or more test scripts to apply to a microservice being offered for uploading to DB 230. The test scripts may include acceptance criterion to determine whether a microservice is permitted to be uploaded to DB 230. For instance, the test script(s) may run pre-defined test cases on the on-boarded artifacts of the microservice. The output of the script is measured against the acceptance criterion and the microservice is either uploaded to DB 230, or rejected. If the microservice is rejected, a notification may be provided to the user via web interface 235. In one example, if the microservice is accepted, the validation may result in the generation of a blueprint file that may be used for the deployment of the microservice in a target cloud environment or other runtime environment via the marketplace function 225. Once the microservice generated from MLM 295 passes the validation function 220, it may be stored in DB 230 and publicized in the catalog. The foregoing description of onboarding MLM 295 and storage of MLM 295 (e.g., the microservice based on MLM 295) in DB 230 is illustrated by paths 281 and 282 in FIG. 2.

In one example, composition function 215 also provides a design studio by which a developer or other users may generate composite solutions comprising one or more MLMs and/or other building blocks (e.g., composite solution 299, which includes MLM 295), and to push such composite solutions to the DB 230 as additional microservices. For example, the composite solution 299 may be generated by a user of device 250 or device 260 using the design studio of composition function 215 via the web interface 235. In accordance with the present disclosure, a composite solution may include a plurality of MLM-based microservices. However, there may be some basic data transformations between the first MLM-based microservice and the second MLM-based microservice. For example, the first MLM-based microservice may be a classifier that operates on a per-packet basis. However, the second MLM-based microservice may be for processing 5 second average files. Thus, the classification decisions of each packet over a 5 second period may be averaged before being fed as an input to the second MLM-based microservice. Accordingly, in one example, non-MLM-based microservices, such as data collectors, data transformers, data cleaners, data labelers, data validators, and so forth, may also be stored in DB 230 and may be retrieved via the design studio of composition function 215. In one example, non-MLM based microservices may be on-boarded and validated in a similar manner to the MLM-based microservices. Alternatively, or in addition, such non-MLM based microservices may be provided by an operator of the platform 205 and on-boarded in another manner.

As discussed above, each on-boarded MLM may have artifacts generated during the onboarding process which may be stored in a file, e.g., a Protobuf file or the like. Thus, for example, the composition function 215 may identify the operations supported by the MLM 295 and the input and output ports associated with each operation from these artifacts. In one example, each operation has an input port which consumes a message and an output port which produces a message. Accordingly, all input and output ports of MLM 295 and the messages consumed and produced thereby may be identified by the composition function 215.

As also described above, the composition function 215 may generate artifacts which define the hooks for MLM 295 to be included into composite solutions, e.g., composite solution 299. For instance, the artifacts may be in accordance with Toplogy and Orchestration Specification for Cloud Application (TOSCA), NetConf, or the like, e.g., for deployment of composite solution 299 in a cloud computing and/or distributed data processing environment, and may be generated from the file attached to the MLM 295. For instance, different components of the composite solution 299 may be deployed in different virtual machines, different physical devices, and so forth which may pass inputs and outputs to collectively perform a data processing task according to the composite solution 299. In one example, the hooks that enable inclusion in composite solution 299 are derived from the message signature of the output and input ports as defined in a configuration file for MLM 295. In addition, the hooks ensure that only compatible ports can be composed together. In other words, the hooks verify that a message produced by an output port can be consumed by the input port of another MLM-based or non-MLM based microservice.

As illustrated in FIG. 2, composite solution 299 may include MLM 295 and other microservices (e.g., MS1-MS4) as building blocks/components. In one example, the composition function 215 checks for message signature compatibility (e.g., of input and output ports of MLM 295 and other building blocks) thereby ensuring a functional composite solution 299. In one example, once the composite solution 299 is generated it is also submitted for validation to validation function 220. In particular, in one example, the validation function 220 may perform the same or similar operations as described above with respect to the validation of the microservice generated from MLM 295. In one example, the validation may result in the generation of a blueprint file that may be used for the deployment of the composite solution 299 in a target cloud environment or other runtime environments via the marketplace function 225. In addition, in one example, the composite solution 299 may be considered as a microservice when validated and stored in DB 230. For example, since the composite solution 299 is comprised of containerized component building blocks, the composite solution 299 may include all of the necessary codes, libraries, and any other data necessary for the composite solution 299 to perform in a runtime environment.

In one example, DB 230 of marketplace function 225 may comprise a set of backend file stores such as a Hadoop Distributed File System (HDFS) and/or another cloud file storage system. In one example, the platform 205 may categorize the microservices in a variety of ways that may be cataloged and searched via the marketplace function 225. For example, the platform 205 may assign a MLM-based microservice or a microservice generated from a composite solution to one or more function categories, or categories of use. For instance, a first MLM may comprise a model trained via multi-class learning for facial recognition. A second MLM may comprise a decision tree-based facial recognition model. Both of these models may be associated with a function category of "facial recognition." The assignment of microservices to categories may be automatically made by the platform 205, or may be selected by a developer that uploads a MLM to the platform 205 or that generates a composite solution via the platform 205.

In one example, the network-based platform also maintains a number of objective measures of performance metrics for microservices. For instance, the network-based platform may store measures of performance metrics such as runtime, consistency of performance, usage, class of service (uptime, updates), accuracy, availability off-line, and reputation of developer. In one example, where a microservice is assigned to more than one function category, the platform 205 may maintain different measures of performance metrics in connection with the different function categories. In one example, the measures of performance metrics may be based upon the platform 205 applying test data sets to the microservices and capturing measurements for various performance metrics. For instance, certain data sets are available for benchmarking video encoding models or composite solutions, other data sets are available for benchmarking image salience detection models or composite solutions, still other data sets are available for benchmarking facial recognition models or composite solutions, and so on.

In one example, a developer or other users (such as a user of device 260) may search DB 230 of the marketplace function 225 via composition function 215 to find and retrieve various microservices, including MLM-based microservices and microservices comprising composite solutions, e.g., composite solution 299. For example, the device 260 may obtain composite solution 299 and deploy the composite solution in environment 265 for testing. In one example, a user may also, via the marketplace function 225, submit a microservice stored in DB 230 (e.g., a MLM-based microservice or a microservice generated from a composite solution) to an orchestrator (e.g., a SDN controller, a GPU cluster master node, etc.) for deployment in a network, e.g., a telecommunication service provider network, a local area network (LAN), a cloud computing infrastructure network, etc. In one example, the orchestrator may call Open Stack application programming interfaces (APIs) of a microservice to deploy the solution to the network. To illustrate, in one example, the composite solution 299 may be selected by a user of device 260 and loaded into the other network-based processing system 245, which may comprise a SDN portion of a telecommunication service provider network, a switch, a router, or a plurality of such components, a GPU cluster, a server of a research university, hospital, enterprise, or other entities engaged in various data processing tasks, and so forth.

It should be noted that data sources 240 may represent various types of data sources in one or more examples. For instance, data sources 240 may comprise network data streams in a telecommunication network, a data feed from an electronic medical diagnostic device, a data feed from a network of sensors, a video and/or audio feed, and so forth. In addition, data from the data sources 240 may also be accessed and utilized as training data for MLMs and/or composite solutions, testing data for MLMs and/or composite solutions, as well as operational data in a non-testing, non-training, production/runtime environment. As such, data sources 240 are illustrated as providing inputs to the onboarding function 210, the composition function 215, the validation function 220, as well as the other network-based processing system 245.

It should also be noted that the example of FIG. 2 is provided as an illustrative example. In other words, in other, further, and different examples, the platform 205 may comprise a different architecture. For instance, operations that are described as being performing in connection with one function may alternatively or additional be performed by a different function. Similarly, the composite solution 299 is just one example of how a composite solution may be composed from microservices/building blocks. In addition, although DB 230 is illustrated as a component of marketplace function 225, it should be noted that the actual storage of microservices may be distributed in a plurality of different storage devices which may reside within a plurality of different physical locations. Thus, for instance, marketplace function 225 may store a uniform resource locator (URL) of each microservice in DB 230, where the actual executable files comprising the microservices may be retrieved from various places in accordance with the respective URLs. Thus, these and other variations, modifications, and/or enhancements, are all contemplated within the scope of the present disclosure.

Figure 3:
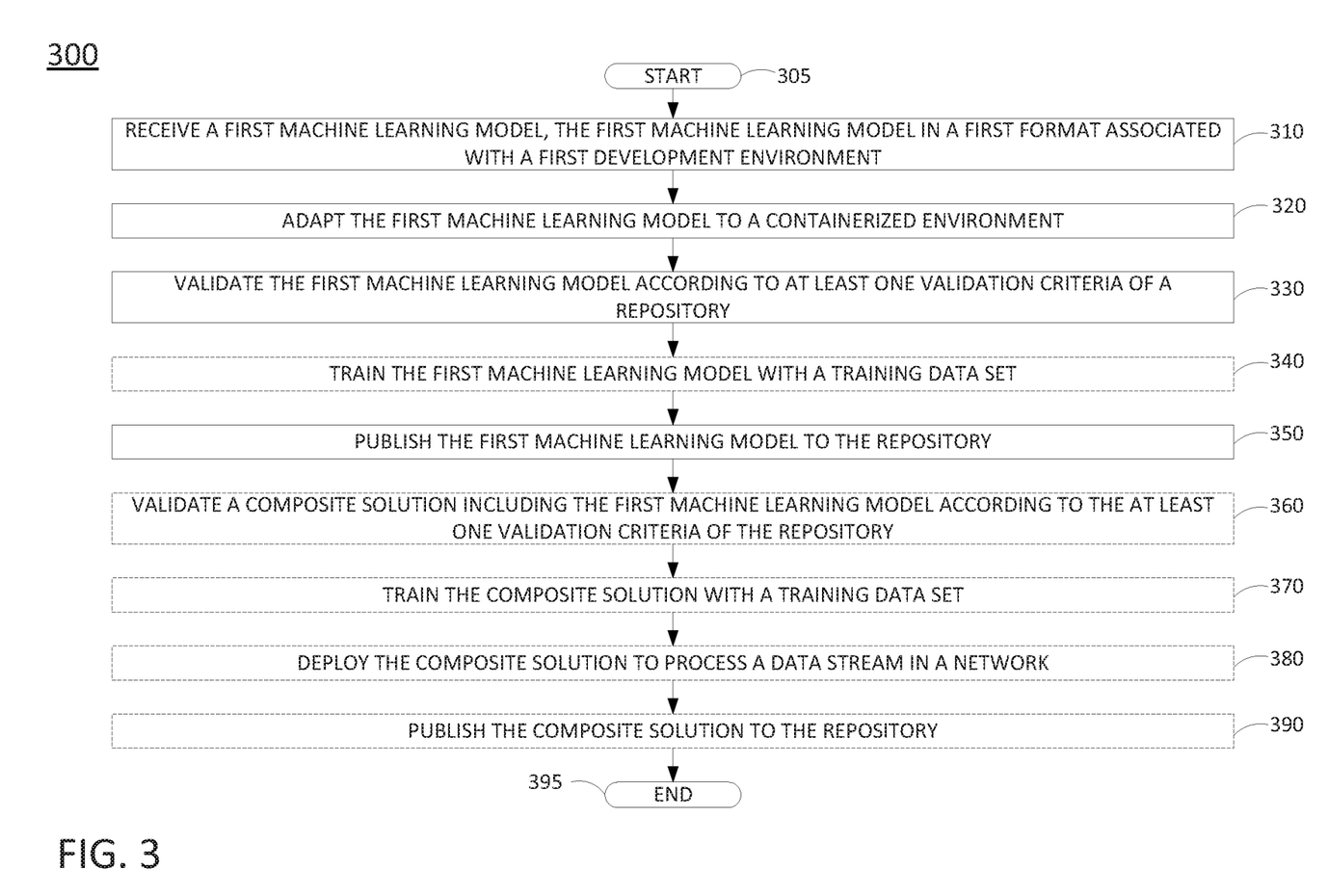
FIG. 3 illustrates an example flowchart of a method for publishing a machine learning model to a repository.

FIG. 3 illustrates an example flowchart of a method 300 for publishing a machine learning model to a repository. In one example, steps, functions and/or operations of the method 300 may be performed by a device as illustrated in FIG. 1, e.g., application server 135, or by a network-based machine learning microservice platform 205 as illustrated in FIG. 2. Alternatively, or in addition, the steps, functions and/or operations of the method 300 may be performed by a processing system collectively comprising a plurality of devices as illustrated in FIG. 1 such as application server 135, DB 146, endpoint devices 111-113 and/or 121-123, or as illustrated in FIG. 2, such as platform 205, device 250, device 260, other network-based processing system 245, and so forth. In one example, the steps, functions, or operations of method 300 may be performed by a computing device or system 400, and/or a processing system 402 as described in connection with FIG. 4 below. For instance, the computing device 400 may represent at least a portion of a platform, a server, an application server, an endpoint device, and so forth, in accordance with the present disclosure. For illustrative purposes, the method 300 is described in greater detail below in connection with an example performed by a processing system. The method 300 begins in step 305 and proceeds to step 310.

At step 310, the processing system receives a first machine learning model, where the first machine learning model is in a first format associated with a first development environment. For example, the first development environment may comprise one of a plurality of machine learning model development environments that are adaptable to a containerized environment. Some examples include H2O, TensorFlow, Keras, Scikit-learn, and the like.

At step 320, the processing system adapts the first machine learning model to a containerized environment. The containerized environment may comprise, for example, Docker, ACI, Rocket, Drawbridge, an OCI-based containerization environment, or the like. In one example, the adapting of the first machine learning model to the containerized environment may comprise generating a first artifact associated with the machine learning model. For instance, the first artifact may include library information for deployment of the machine learning model in the containerized environment. To illustrate, the first artifact may include library information from the containerized environment. Alternatively, or in addition, the first artifact may also include library information associated with repository (e.g., required or preferred by the marketplace system). Similarly, the first artifact may also include library information that is specific to the MLM developer's environment (e.g., libraries that are installed at the developer's workstation that may be necessary or preferred for the MLM to function).

In one example, the adapting of the first machine learning model to the containerized environment further comprises defining at least a second artifact associated with the first machine learning model. For instance, the at least second artifact may define an external compatibility of at least one of an input port or an output port of the machine learning model. For example, the external compatibility relates to an interoperability of an output or input of the first machine learning model with an input or an output respectively of another MLM-based microservice, e.g., generated from a second machine learning model, a composite solution, or a non-machine learning model-based microservice.

At step 330, the processing system validates the first machine learning model according to at least one validation criterion associated with a repository. For instance, the at least one validation criterion associated with repository can be one or more validation criteria associated with the containerized environment and/or one or more validation criteria imposed by the repository provider. In one example, step 330 may alternatively or additionally comprise applying marketplace or user constraints, e.g., a cost, an availability for local execution, an availability for network-based execution, an availability for retraining, an availability of source code for inspection, an availability of a third-party verification, a system compatibility, a geographic availability, etc. Note that containerization may generally enable compatibility of an application with any system that supports the containerized environment. However, a MLM-based microservice and/or a composite solution including the MLM may be incompatible with a target system based upon a memory footprint, too large of a working data set, etc., even if there are no issues regarding the type of operating system, availability of appropriate libraries, etc. As such, these are all aspects that may be tested in the validation step.

In one example, the at least one validation criterion comprises an outcome of an application of a test data set to the first machine learning model in a simulation. For instance, the at least one validation criterion may comprise a lack of errors in the simulation according to a test script, an expected or anticipated result, confirmation of conformance with requirements of the containerized environment, a target network, a target device or system, and so forth. Step 330 may include an application of the testing data set to an artifact generated from the first MLM, e.g., the first artifact and/or the second artifact associated with the machine learning model as discussed above.

At optional step 340, the processing system may train the first machine learning model with a training data set. For instance, as discussed above, the first MLM can be trained or untrained when the first MLM is received at step 310. In addition, the first MLM may be partially trained and can be further trained per optional step 340. The first MLM can be trained in response to instruction from a user (e.g., modeler, analyst, data scientist, etc.). In addition, the training data can be selected by the processing system, or obtained by the user and provided to the processing system.

At step 350, the processing system publishes the first machine learning model to the repository. For instance, the first machine learning model may be published to the repository as a microservice. To illustrate, the repository may store a plurality of microservices, each of which may comprise an executable package generated from a machine learning model, a non-machine learning model-based executable package, or an executable package generated from a composite solution. In one example, the repository may comprise a set of backend file stores such as a Hadoop Distributed File System (HDFS) and/or another cloud file storage system. In one example, the repository may comprise a component of the processing system performing the method 300. In addition, in one example, the repository includes a search function for searching microservices stored in the repository. For instance, the search function may allow a user to search for microservices based upon a topic, a popularity, a type of function of a microservice, a ranking based upon at least one performance metric, an author/developer, and so on.

At optional step 360, the processing system may validate a composite solution including the first machine learning model according to the at least one validation criteria associated with the repository. In one example, the composite solution may be received from a user workstation. The at least one validation criterion can be the same as or similar to the at least one validation criterion described above in connection with step 330. For instance, the at least one validation criterion can be a lack of errors in a simulation environment according to a test script, an expected or anticipated result, confirmation of conformance with requirements of the environment, e.g., memory footprint, etc. The at least one validation criterion can also comprise marketplace or user constraints or a performance metric, as described above.

In one example, the composite solution may be validated by determining a compatibility of at least a first artifact associated with the first machine learning model with at least a second artifact. For example, the first machine learning model may comprise a first process of the composite solution, and the at least second artifact may be associated with a second process of the solution that is stored in the repository and that is compatible with the containerized environment. In other words, the second process may comprise a second microservice that has been packaged for the containerized environment. As such, the at least second artifact may be generated from another machine learning model or may comprise an artifact associated with a non-machine learning model-based microservice. In one example, the at least a first artifact defines a compatibility of at least one of an input port or an output port of the first machine learning model with at least one of an input port or an output port of the second process.

At optional step 370, the processing system may train the composite solution with a training data set. For example, the composite solution can be trained or untrained when the composite solution is received in connection with optional step 360. In another example, the composite solution may be partially trained when received in connection with optional step 360 and can be further trained at optional step 370. For instance, the composite solution can be trained in response to instruction from a user (e.g., modeler, analyst, data scientist, etc.). In one example, the training data can be selected by the processing system, or obtained by the user and provided to the processing system.

At optional step 380, the processing system may deploy the composite solution to process a data stream in a network. For instance, as discussed above, the composite solution may be selected by a user and loaded into another network-based processing system, which may comprise a SDN portion of a telecommunication service provider network, a switch, a router, or a plurality of such components, a GPU cluster, a server of a research university, hospital, enterprise, or other entities engaged in various data processing tasks, and so forth. In one example, the target device may be provided with one or more URLs to retrieve the composite solution from the repository.

At optional step 390, the processing system may publish the composite solution to the repository. In one example, the composite solution is published to the repository as a microservice. For instance, in accordance with the present disclosure, a microservice comprises an executable package comprising a set of artifacts to enable a performance of a data processing task. As described above, the set of artifacts, e.g., a set of configuration files, may include at least one script defining the first machine learning model, at least a first library associated with the first development environment, configuration data for the first machine learning model, and external compatibility information for at least one of an input port or an output port of the first machine learning model. In addition, the composite solution may include a number of similar artifacts characterizing the various microservices from which the composite solution is composed. In one example, the artifacts may further include at least a second library associated with the containerized environment. For instance, the second library may comprise a Docker library, or a library for another containerized environment as described above.

Following step 350, or any of optional steps 360-390, the method 300 ends in step 395. It should be noted that the method 300 may be expanded to include additional steps or may be modified to include additional operations with respect to the steps outlined above. For instance, the processing system may assist a user or developer in retraining an MLM, evaluate whether improved performance may be obtained from a retrained MLM for a given task, and so forth. In another example, the processing system may make recommendations to the user regarding non-MLM-based microservices that can or should be implemented before or in conjunction with one or more MLM-based microservices, or in connection with a particular MLM. In still another example, optional step 340 may alternatively be performed before step 330. Similarly, optional step 370 may alternatively be performed before optional step 360. Thus, these and other modifications are all contemplated within the scope of the present disclosure.

In addition, although not specifically specified, one or more steps, functions or operations of the method 300 may include a storing, displaying and/or outputting step as required for a particular application. In other words, any data, records, fields, and/or intermediate results discussed in the method 300 can be stored, displayed and/or outputted either on the device executing the method 300, or to another device, as required for a particular application. Furthermore, steps, blocks, functions, or operations in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the examples of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for publishing a machine learning model to a repository, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, transceivers, power units, and so forth. Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for publishing a machine learning model to a repository (e.g., a software program comprising computer-executable instructions) can be loaded into memory 404 and executed by hardware processor element 402 to implement the steps, functions, or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for publishing a machine learning model to a repository (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
receiving, by a processing system including at least one processor, a first machine learning model, wherein the first machine learning model is in a first format associated with a first development environment;
adapting, by the processing system, the first machine learning model to a containerized environment, wherein the adapting the first machine learning model to the containerized environment comprises:
generating a first artifact associated with the first machine learning model, wherein the first artifact includes library information for deployment of the first machine learning model in the containerized environment; and
defining at least a second artifact associated with the first machine learning model, wherein the at least the second artifact defines an external compatibility of at least one of: an input port or an output port of the first machine learning model;
validating, by the processing system, the first machine learning model according to at least one validation criterion associated with a repository; and
publishing, by the processing system, the first machine learning model to the repository.

2. The method of claim 1, wherein the at least one validation criterion comprises:
an outcome of an application of a test data set to the first machine learning model in a simulation.

3. The method of claim 1, wherein the validating the first machine learning model according to the at least one validation criterion associated with the repository comprises:
validating the first artifact and the second artifact associated with the first machine learning model.

4. The method of claim 1, further comprising:
training the first machine learning model with a training data set.

5. The method of claim 1, further comprising:
validating a composite solution including the first machine learning model according to the at least one validation criterion associated with the repository.

6. The method of claim 5, wherein the validating the composite solution comprises:
determining a compatibility of at least the second artifact associated with the first machine learning model with at least a third artifact, wherein the first machine learning model comprises a first process of the composite solution, wherein the at least the third artifact is associated with a second process of the composite solution that is stored in the repository and is compatible with the containerized environment.

7. The method of claim 6, wherein the second artifact defines the compatibility of the at least one of the input port or the output port of the first machine learning model with at least one of an input port or an output port of the second process.

8. The method of claim 5, further comprising:
training the composite solution with a training data set.

9. The method of claim 5, wherein the composite solution is received from a user workstation.

10. The method of claim 5, further comprising:
deploying the composite solution to process a data stream in a network.

11. The method of claim 5, further comprising:
publishing the composite solution to the repository.

12. The method of claim 1, wherein the first machine learning model is published to the repository as a microservice.

13. The method of claim 12, wherein the microservice comprises an executable package comprising a set of artifacts to enable a performance of a data processing task, the set of artifacts including:
at least one script defining the first machine learning model;
at least a first library associated with the first development environment;
configuration data for the first machine learning model; and
the second artifact.

14. The method of claim 13, wherein the set of artifacts further includes:
the first artifact.

15. The method of claim 1, wherein the repository includes a search function for searching for at least one microservice stored in the repository based upon at least one of:
a topic;
a popularity;
a type of function;
a ranking based upon at least one performance metric; or
an author.

16. The method of claim 15, wherein each of the at least one microservice comprises one of:
an executable package generated from one of a plurality of machine learning models;
a non-machine learning model-based executable package; or
an executable package generated from a composite solution comprising at least one other artifact.

17. A non-transitory computer-readable storage medium storing instructions which, when executed by a processing system including at least one processor, cause the processing system to perform operations, the operations comprising:
receiving a first machine learning model, wherein the first machine learning model is in a first format associated with a first development environment;
adapting the first machine learning model to a containerized environment, wherein the adapting the first machine learning model to the containerized environment comprises:
generating a first artifact associated with the first machine learning model, wherein the first artifact includes library information for deployment of the first machine learning model in the containerized environment; and
defining at least a second artifact associated with the first machine learning model, wherein the at least the second artifact defines an external compatibility of at least one of an input port or an output port of the first machine learning model;
validating the first machine learning model according to at least one validation criterion associated with a repository; and
publishing the first machine learning model to the repository.

18. A device comprising:
a processing system including at least one processor; and
a computer-readable medium storing instructions which, when executed by the processing system, cause the processing system to perform operations, the operations comprising:
receiving a first machine learning model, wherein the first machine learning model is in a first format associated with a first development environment;
adapting the first machine learning model to a containerized environment, wherein the adapting the first machine learning model to the containerized environment comprises:
generating a first artifact associated with the first machine learning model, wherein the first artifact includes library information for deployment of the first machine learning model in the containerized environment; and
defining at least a second artifact associated with the first machine learning model, wherein the at least the second artifact defines an external compatibility of at least one of an input port or an output port of the first machine learning model;
validating the first machine learning model according to at least one validation criterion associated with a repository; and
publishing the first machine learning model to the repository.

19. The device of claim 18, wherein the validating the first machine learning model according to the at least one validation criterion associated with the repository comprises:
validating the first artifact and the second artifact associated with the first machine learning model.

20. The device of claim 18, wherein the operations further comprise:
validating a composite solution including the first machine learning model according to the at least one validation criterion associated with the repository.

* * * * *